(12) United States Patent
Shultz

(10) Patent No.: US 12,278,489 B1
(45) Date of Patent: Apr. 15, 2025

(54) UTILITY DISTRIBUTION TRANSFORMER OVERLOAD/BLACKOUT PREVENTING SYSTEM

(71) Applicant: Larry M. Shultz, Beverly Hills, CA (US)

(72) Inventor: Larry M. Shultz, Beverly Hills, CA (US)

( * ) Notice: Subject to any disclaimer, the term of this patent is extended or adjusted under 35 U.S.C. 154(b) by 0 days.

(21) Appl. No.: 18/895,699

(22) Filed: Sep. 25, 2024

(51) Int. Cl.
*H02J 3/00* (2006.01)
*H02J 3/32* (2006.01)
*H02J 3/38* (2006.01)

(52) U.S. Cl.
CPC ............ *H02J 3/0012* (2020.01); *H02J 3/32* (2013.01); *H02J 3/381* (2013.01); *H02J 2203/10* (2020.01); *H02J 2203/20* (2020.01)

(58) Field of Classification Search
CPC .. H02J 3/0012; H02J 3/32; H02J 3/381; H02J 2203/10; H02J 2203/20
See application file for complete search history.

(56) References Cited

U.S. PATENT DOCUMENTS

| | | | | |
|---|---|---|---|---|
| 2002/0161558 | A1* | 10/2002 | Georges ............ | G05B 23/0245 702/189 |
| 2014/0172503 | A1* | 6/2014 | Hammerstrom ....... | G05B 15/02 705/7.31 |
| 2014/0297206 | A1* | 10/2014 | Silverman ......... | H02J 13/00034 702/58 |
| 2016/0047765 | A1* | 2/2016 | Feng .................... | H01F 27/402 374/4 |
| 2016/0118795 | A1* | 4/2016 | Berkowitz ............. | G05B 15/02 700/286 |

* cited by examiner

*Primary Examiner* — Ziaul Karim
(74) *Attorney, Agent, or Firm* — Rivka Friedman

(57) ABSTRACT

The present invention provides a system designed to prevent overload and blackout in utility distribution transformers within a local power grid. It includes a utility distribution transformer, users, and a local storage battery, all coordinated through utility load balancing. A temperature-sensing module monitors real-time heat variations, while an electrical output-sensing module tracks and calculates demand. Data from these modules is stored in a database for historical and real-time analysis. An integrated analysis module processes this data to detect decreases in transformer output power. Upon detection, the system discharges energy from the local storage battery to balance the load. Additionally, if a decrease in output power occurs alongside rising temperature, the system alerts the utility service provider to address potential issues and prevent failures. A communication module ensures seamless interaction between the inverter, utility service provider, and end-user via a user-application interface, enhancing coordination and reliability across the grid.

18 Claims, 3 Drawing Sheets

UTILITY DISTRIBUTION TRANSFORMER OVERLOAD/BLACKOUT PREVENTING SYSTEM

FIELD OF THE INVENTION

The present invention relates to power grid management and energy distribution, and in particular, relates to a utility load-balancing system using energy storage to prevent or delay overloads on utility distribution transformers and local power blackouts.

BACKGROUND OF THE INVENTION

In power grid systems, the efficient management of energy distribution and load balancing is crucial for maintaining system stability and preventing outages. Utility distribution transformers play a pivotal role in regulating voltage and distributing electricity to local networks. However, these transformers are often subject to overloads and temperature fluctuations, which can lead to reduced performance, potential failures, and local power blackouts.

Traditional power grid management systems typically rely on fixed infrastructure and reactive measures, which may not adequately address the dynamic and unpredictable nature of energy demands and transformer conditions. With the increasing integration of renewable energy sources and the growing demand for reliable power, there is a pressing need for more sophisticated and responsive systems that can effectively monitor and manage transformer performance in real-time.

U.S. Pat. No. 11,710,967 B2 discloses an energy storage and supply management system designed to enhance power grid efficiency. This system features a control unit that communicates with the power grid and an energy storage unit for storing and supplying power. The system supports integration with both traditional utility power and various local power generation sources such as solar and wind. It offers flexibility in its configuration, with options for housing the energy storage unit and control unit together or separately, and even integrating the storage unit into appliances. However, the limitations of the system include potential integration challenges with legacy grid infrastructure and a lack of specific mechanisms for real-time monitoring and dynamic load balancing.

U.S. Pat. No. 11,190,017 B1 discloses a smart local power distribution (SLPD) system aimed at improving local power generation and consumption efficiency. This system includes a local distribution grid connected to a regional power grid via a local power manager, which features a local power storage unit and multiple power meters. The storage unit stores excess locally generated power and provides supplemental power to reduce reliance on regionally supplied power and minimize peak-time usage. The local power manager analyzes data from power meters to generate load and generation profiles and make data-driven decisions to optimize the system's efficiency. Despite its advancements, this prior art does not fully address real-time grid demands or the integration of advanced communication technologies for dynamic load balancing.

One of the significant challenges in current power grid systems is the lack of a standardized battery inverter communications protocol. This absence leads to compatibility issues among various battery and inverter systems, resulting in inefficiencies and potential power losses. Furthermore, the reliance on diesel generators for emergency standby power is problematic due to long startup times and high $CO2$ emissions. Battery storage systems, in contrast, can deliver instant power without toxic emissions, presenting a more environmentally friendly alternative.

Additionally, the lack of a standardized protocol complicates regulatory compliance and impedes the widespread adoption of battery storage systems. With the rise of Electric Vehicles and the shift towards intermittent green energy sources, the need for a standardized protocol that allows utilities to efficiently manage and purchase power from battery systems becomes increasingly critical. Such a protocol would facilitate seamless integration, optimize grid stability, and enhance overall energy efficiency.

Thus, there is a pressing need for a standardized battery inverter communications protocol that addresses these challenges by enabling efficient power transactions between utilities and battery storage systems, improving grid stability, reducing environmental impact, and streamlining regulatory compliance.

OBJECTIVE OF THE INVENTION

An objective of the present invention is to achieve Real-Time Monitoring of utility distribution transformers, thereby allowing for the early detection of potential problems that could cause transformer overloads or failures.

Another objective of the present invention is Dynamic Load Balancing by utilizing both real-time and historical data, effectively managing and balancing energy loads through coordination with local storage battery systems.

One more objective of the present invention is the seamless integration of local energy storage solutions, such as Tesla batteries and solar battery tiles, with the utility grid to ensure a stable and reliable energy supply while bolstering the resilience of the grid.

Yet another objective of the present invention is to enhance responsiveness by automatically releasing stored energy from local battery systems in reaction to transformer heat and load conditions thereby, timely mitigation of transformer power deficiencies and maintaining uninterrupted service for connected consumers ultimately resulting in lower production costs and increased throughput.

Another objective of the present invention is to enable battery owners to sell 50%-75% of their stored battery power to utilities. The communication module facilitates the transfer of this energy when the utility needs to stabilize the grid, allowing both homeowners and businesses to contribute to energy trading and grid support.

Another objective of the present invention is to include mechanisms for managing emergency standby power commitments. The communication module allows utilities to request reserved energy from battery owners during critical situations, providing immediate access to reliable power. Users are compensated for their standby power contributions.

SUMMARY OF THE INVENTION

The present invention provides a comprehensive utility distribution transformer overload/blackout prevention system that integrates real-time temperature monitoring, advanced data analysis, and dynamic load management. This system not only enhances the ability to monitor and respond to transformer conditions but also leverages local energy storage to balance and stabilize the power grid. This invention improves the reliability and efficiency of power grid management, ultimately reducing the risk of transformer failures and local power blackouts.

In an embodiment, the utility distribution transformer overload/blackout prevention system involves a utility service provider supplying power to multiple users through a utility distribution transformer and a load-balancing system. This system features a local storage battery and an inverter connected to the user's setup, along with a temperature-sensing module that monitors real-time heat variations in the transformer. An electrical output-sensing module tracks the transformer's output in real-time and calculates the demand at specific moments. All data, including heat, electrical output, and demand variations, are stored in a database for historical and real-time analysis. An analysis module compares these real-time values with historical data to evaluate the transformer's performance. Seamless communication is enabled through a communication module that links the inverter, utility service provider, and user via an app interface, allowing for efficient load management and system monitoring.

In one embodiment, the system is equipped with functionality that, upon detecting both a decrease in power output and an increase in transformer temperature, sends an alert to the utility service provider. Alternatively, if only a decrease in transformer output is observed without a temperature change, the system discharges stored electrical energy from the local storage battery into the power grid to help balance the load.

In an embodiment, the local storage battery system features modular slots designed to accommodate various types of energy storage devices.

In an embodiment, the temperature sensors communicate using WiFi, cellular signals, or hardwired connections mounted on telephone poles.

In an embodiment, the communication module further comprises an Inverter Communication Module (ICM) configured to convert direct current (DC) from a battery into alternating current (AC) and manage power dispatch to a power grid.

In one embodiment, the communication module includes a Utility Communication Interface (UCI) designed to continuously monitor available power, deliver real-time data for power dispatch requests, and manage power commitment agreements and emergency standby power based on current grid demand.

In one embodiment, the communication module includes a Utility Communication Interface (UCI) designed to continuously monitor available power, deliver real-time data for power dispatch requests, and manage power commitment agreements and emergency standby power based on current grid demand.

In one embodiment, the communication module includes a User App Interface (UAI) that allows users to grant the utility service provider access to control the inverter. It also provides real-time notifications for power dispatch and standby commitments and enables users to monitor battery status, dispatch activity, and earnings.

In one embodiment, the communication module includes a Localization and Control Mechanism (LCM) that utilizes geolocation to align the user's location with the local utility's grid. It ensures that power dispatch requests are localized and obtains user consent for each request through the User App Interface (UAI). In one embodiment, the communication module includes a User App Interface (UAI) designed to manage user permissions, receive real-time notifications, and monitor battery power status and dispatch activities.

In another embodiment, the method for preventing overload and blackouts in a utility distribution transformer includes several key steps. First, a temperature-sensing module receives real-time heat variation values from the transformer. Simultaneously, an electrical output-sensing module measures real-time electrical output and calculates demand. These real-time values, along with corresponding historical data, are stored in a database. An analysis module then compares the real-time data with historical data to assess transformer performance. The results are communicated to an inverter connected to a local storage battery, and information is transmitted to both the utility service provider and the user through an application interface. Based on the analysis, the system adjusts the power supplied by the local storage battery via the inverter to balance the load and prevent transformer overload. Finally, power distribution to the local grid is controlled according to demand and transformer performance to avert blackout conditions.

Initially, real-time heat variation values are obtained from the transformer using a temperature-sensing module, and real-time electrical output values are gathered through an electrical output-sensing module to determine the electrical output demand. Both historical and real-time data concerning heat variation, electrical output, and demand are stored. An analysis module then processes this data to identify any decrease in the transformer's output power. If a decrease is detected, the system discharges stored electrical energy from a local storage battery into the power grid to help balance the load. If both a decrease in output and an increase in temperature are observed, an alert is sent to the electricity service provider. Finally, the historical data on temperature and electrical output is updated in the database based on the analysis.

In an embodiment, the historical data includes minute-by-minute measurements of real-time electrical output values and real-time heat variation values.

In an embodiment, the method further includes calculating the rate of change of temperature and voltage fluctuations to improve the accuracy of real-time information regarding heat variations and changes in output power.

In an embodiment, the amount of energy discharged from the local storage battery is determined using an optimization algorithm that takes into account predicted future energy demand and transformer performance trends.

In an embodiment, the method further includes generating real-time warning alerts for increases in temperature and transformer shutdowns.

In an embodiment, the method further comprises converting, by the Inverter Communication Module (ICM), direct current (DC) from the local storage battery into alternating current (AC) and managing power dispatch to the power grid based on real-time demand.

In an embodiment, the method further comprises tracking, via the Utility Communication Interface (UCI), available power from the local storage battery in real-time, providing real-time data for power dispatch requests, managing power commitment agreements and emergency standby power based on real-time grid demand.

In an embodiment, the method further comprises granting, via the User App Interface (UAI), permissions to the utility service provider to access and control the inverter; sending real-time notifications for power dispatch and standby commitments; and monitoring battery status, dispatch activity, and earnings from energy contributions.

In an embodiment, the method further includes using the Localization and Control Mechanism (LCM) to leverage geolocation technology for aligning the user's location with the local utility's grid. This ensures that power dispatch requests are localized to the appropriate area. Additionally, the User App Interface (UAI) is used to obtain user consent for each power dispatch request.

In an embodiment, the method further comprises enabling user permissions through the User Application Interface (UAI) to interact with the utility grid. It includes receiving real-time notifications about battery power status and dispatch activity, as well as monitoring battery charge levels, dispatch commitments, and standby status.

In an embodiment, a computer-implemented method is disclosed that comprises receiving, via the User Communication Interface (UCI), an emergency power request from a requesting user, wherein the UCI facilitates communication between the user device and the utility service provider to initiate the request. Said computer-implemented method includes localizing, via the Localization and Control Mechanism (LCM), the requesting user's geo-location and matching the user's location to the appropriate local grid for efficient power distribution management; processing, via the LCM, the localized request by evaluating the available power capacity of other users within the local grid and generating a power distribution signal, contingent upon receiving consent from at least one provider user to supply power through the local grid; assessing power capacity, via the Inverter Communication Module (ICM), in the local storage battery inverter associated with the provider user, ensuring that sufficient power is available for distribution, and managing, via the utility service provider, the power distribution from the provider user to the requesting user through the local grid, ensuring optimal power transfer based on real-time capacity and demand changes.

In an embodiment, the computer-implemented method further comprises receiving from a user via the User Communication Interface (UCI), a payment request from the utility service provider for an amount of power supplied by the user to the local grid.

In an embodiment, said method calculates a payment amount based on the amount of power supplied by the user and pre-determined payment rates or agreements between the utility service provider and the user.

In an embodiment, the method includes issuing said calculated payment through a financial transaction system integrated within the User Application Interface (UAI) to the provider user.

In an embodiment, the computer-implemented method further comprises displaying to the user, via the User Application Interface (UAI), the amount of power supplied to the grid by the user, the corresponding payment received for the amount of power supplied, which includes a breakdown of standby payments and payments for actual power supplied.

In an embodiment, the computer-implemented method also includes updating, in a database, stored historical data on the amount of power supplied by a plurality of users and the corresponding payment records.

BRIEF DESCRIPTION OF THE DRAWINGS

Non-limiting examples of the present disclosure will be described in the following, with reference to the appended drawings, in which.

DETAILED DESCRIPTION OF THE INVENTION

Some embodiments of this invention, illustrating all its features, will now be discussed in detail. The words "comprising," "having," "containing," and "including," and other forms thereof, are intended to be equivalent in meaning and be open-ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context dictates otherwise. Although any systems and methods similar or equivalent to those described herein can be used in the practice or testing of embodiments of the present invention, the preferred, systems and methods are now described.

The present invention aims to to enhance the stability, efficiency, and resilience of power grids by implementing a utility load-balancing system that monitors transformer temperature in real-time, effectively manages energy distribution, and integrates local storage battery systems. By automating the detection of transformer overloads and dynamically balancing energy loads, the invention seeks to prevent power outages, optimize energy use, and ensure continuous service to users, particularly during peak demand or emergencies.

Figure 1:
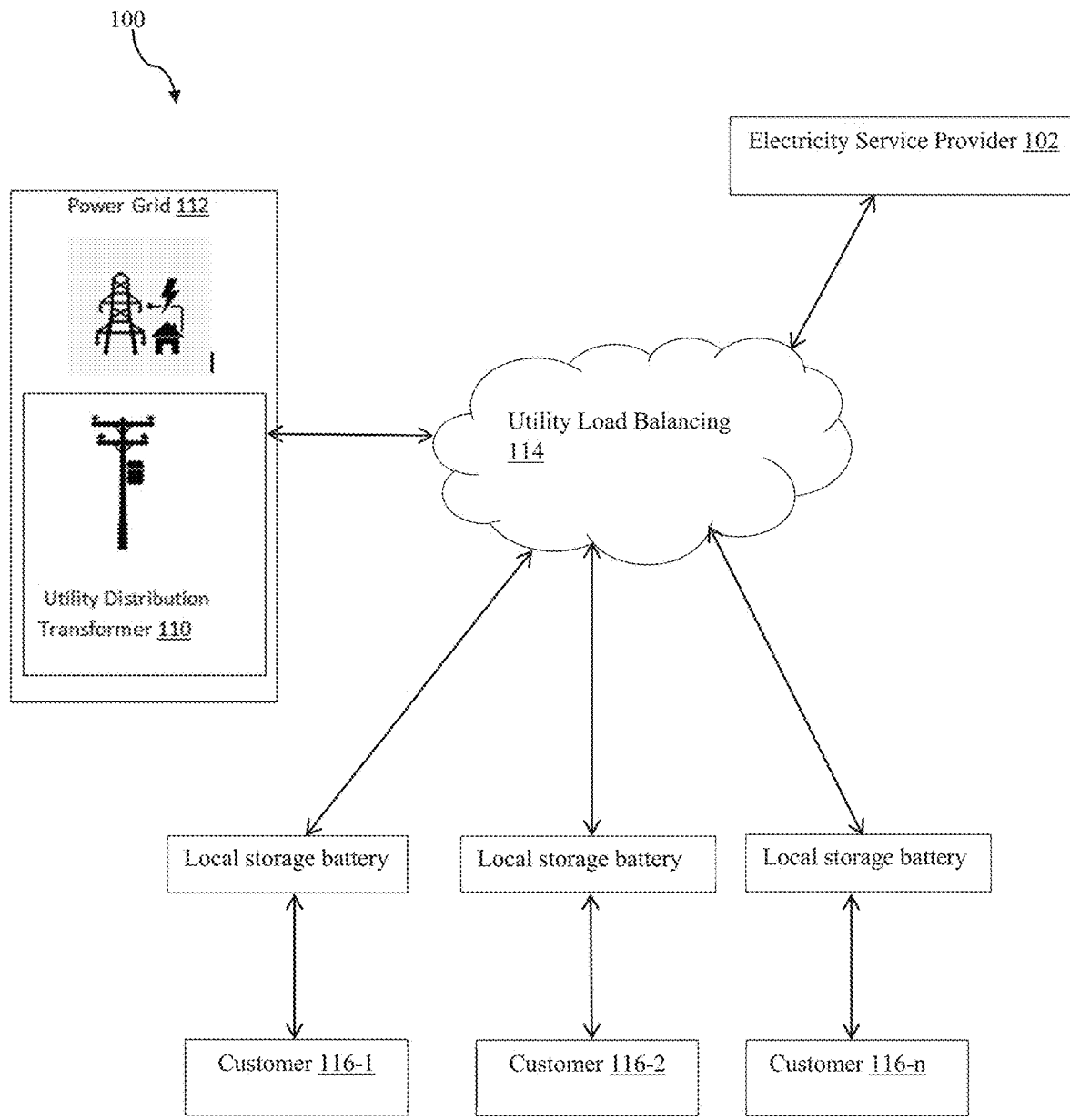
FIG. 1 of the present invention illustrates a block diagram for a utility distribution transformer overload/blackout prevention system according to an embodiment of the present invention.

FIG. 1 illustrates a utility distribution transformer overload/blackout prevention system 100. System 100 which includes a utility load-balancing system 114 connected to the power grid 112 is responsible for managing the power flow within the grid. The system also includes Utility Service Provider 102, which is involved in the overall management and distribution of electricity within the grid.

The power grid 112 represents one or more systems responsible for generating and/or supplying electricity to users (118-1 to 118-n). For instance, power grid 112 can encompass systems that generate electricity through various methods such as coal-fired plants, oil-fired plants, natural gas plants, nuclear plants, and renewable sources like solar, wind, hydroelectric, biomass, and wave or tidal energy. Additionally, the power grid 112 includes an electrical transmission and distribution network that transports electricity from the power generation source to users (118-1 to 118-n). This network typically consists of transmission lines, substations, transformers, and other infrastructure necessary to deliver power to residential, commercial, and industrial users.

The power grid 112 comprises at least one utility distribution transformer 110, which is crucial for stepping down the high-voltage electricity from the grid to a lower voltage suitable for distribution to users (118-1 to 118-n) . . . . In an aspect of the power grid, 112 is connected to the utility load-balancing system 114 through electrical transmission and distribution lines, which function to transmit power generated by various power producers to the utility load-balancing system 114. The utility load-balancing system 114 monitors the performance of the utility distribution transformer 110 and ensures that the transformer operates efficiently by balancing the load across the power grid 112, thereby preventing overloads and potential power outages.

In the context of the present disclosure, the utility distribution transformer 110 plays a vital role in the power grid 112 by stepping down high-voltage electricity to a lower, safer voltage for distribution to users (118-1 to 118-*n*). It is equipped with sensors to monitor its operational status, including temperature and electrical output. This real-time data is crucial for the utility load-balancing system 114, which is connected to the transformer through a network of electrical transmission and distribution lines.

The utility load-balancing system 114 is illustrative of one or more software applications, modules, or computing devices operable or configured to manage the distribution and balancing of power within the power grid 112, including the storage of surplus energy and the consumption of power supplied by the power grid 112. These computing devices may encompass, but are not limited to: servers, desktop computers, laptops, tablets, smartphones, personal digital assistants, and distributed systems functioning across multiple devices. While not shown in the diagram, those skilled in the art will recognize that various intermediary computing and networking devices may be present between the components of the example system 100 to enable communication between the different elements, potentially through the Internet and one or more Intranets.

In further aspects, the utility load-balancing system 114 may also be configured to receive and analyze power utilization data to identify inefficiencies in the power distribution system and determine corrective actions to alleviate these inefficiencies. The utility load-balancing system 114 uses this data to manage and optimize power distribution, addressing issues like overheating or overloads to ensure a stable and reliable power supply. This integration allows for efficient energy management and helps prevent power disruptions by enabling proactive adjustments based on the transformer's performance.

In accordance with the present disclosure, the utility load-balancing system 114 incorporates a local storage battery (116-1 to 116 *n*) designed to manage and store excess energy while regulating power distribution within the system. This battery system leverages cutting-edge technologies, including Tesla batteries, Generac batteries, solar battery tiles, or other advanced energy-storing devices, to accumulate substantial amounts of energy. It is configured to track and store surplus energy produced during low-demand periods. During instances of transformer overload, overheating, or local power outages, the utility load-balancing system 114 can instruct the local storage battery (116-1 to 116 *n*) to release the stored energy back into the power grid 112. This action aids in stabilizing the power output from the utility distribution transformer 110, ensuring that the energy needs of connected users are met even in emergency conditions. By offering a decentralized and adaptive energy reserve, the local storage battery (116-1 to 116 *n*) is vital for maintaining grid stability and preventing power interruptions.

The Utility Service Provider 102 is seamlessly integrated with the utility load-balancing system 114, offering the ability to closely monitor, regulate, and control the flow of electricity within the power grid 112. The Utility Service Provider 102 collaborates with the utility load-balancing system 114 to ensure efficient electricity distribution and can precisely adjust the timing, quantity, and quality of power delivered back to the power grid 112. This capability is vital for maintaining grid stability, especially during fluctuating demand or intermittent power generation. By utilizing the system's advanced monitoring and control features, Utility Service Provider 102 can prevent destabilizations, ensuring that electricity is managed effectively to meet user needs while preserving grid integrity. This integration positions Utility Service Provider 102 as a key player in the real-time management of energy flow, adapting to the dynamic conditions of the power grid 112.

Figure 2:
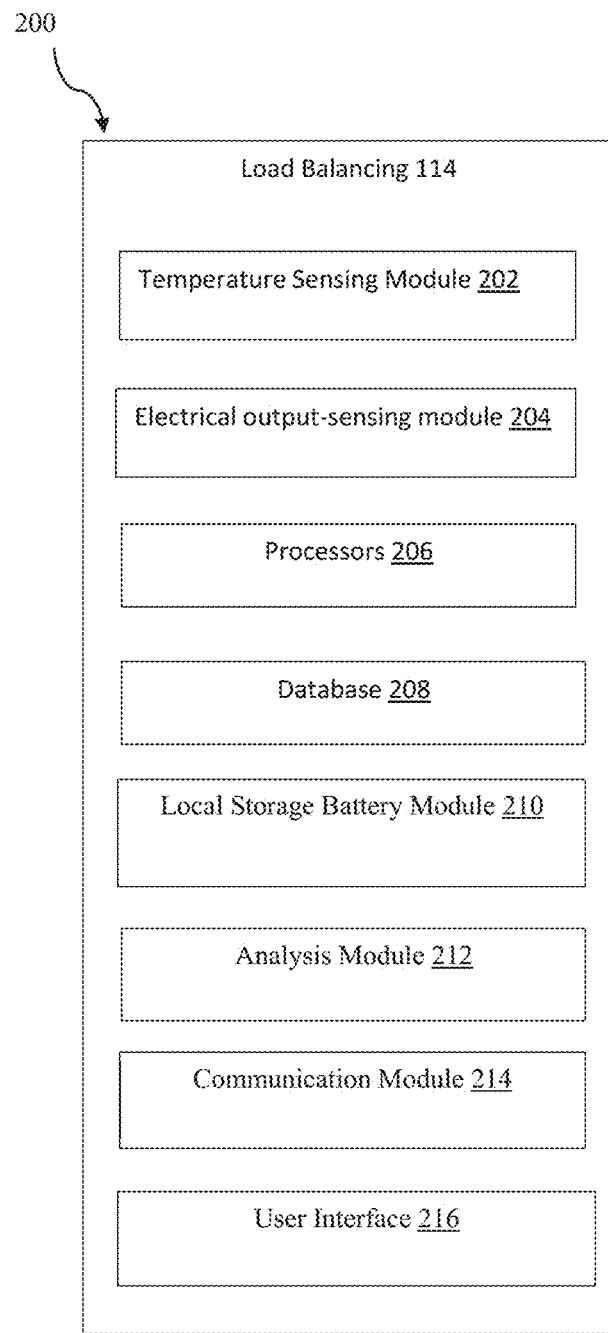
FIG. 2 illustrates a block diagram of the utility load-balancing system of FIG. 1 according to one embodiment of the present invention.

FIG. 2 illustrates the utility load-balancing system 114 that comprises several key components to ensure efficient management and optimization of power distribution. The system includes a temperature sensing module 202, which continuously monitors the temperature of the utility distribution transformer 110 to detect any overheating issues. Complementing this is an electrical output sensing module 204, which measures the transformer's electrical output, including current and voltage levels. These sensors feed data to a processor 206, which analyzes the information and stores it in a database 208 for historical reference and real-time processing. The local storage battery module 210 is integrated to store excess energy and discharge it as needed to balance the transformer's output. An analysis module 212 uses the data to identify potential inefficiencies or overloads and facilitates necessary adjustments. A communication module 214 acts as the central hub for managing seamless interactions between various components of the utility load-balancing system 114 and external entities, such as utility service providers 102 and users 118-1 to 118-*n*. It facilitates real-time data transmission, enabling efficient coordination to prevent overloads and optimize energy distribution.

Further, a temperature sensing module 202 plays a crucial role in monitoring the health and efficiency of the utility distribution transformer 110. This module 202 is designed to provide real-time temperature measurements of the transformer, which are essential for detecting overheating conditions that could lead to potential failures or inefficiencies. Equipped with advanced sensors, the temperature sensing module 202 continuously tracks minute-by-minute fluctuations in the transformer's temperature, ensuring accurate and timely data collection. This real-time data is then fed into the utility load-balancing system 114, allowing for proactive management and immediate response to any overheating issues. By integrating the temperature sensing module 202, the system enhances its ability to prevent transformer overloads, optimize performance, and maintain overall grid stability.

An electrical output sensing module 204 is integral to assessing the performance and capacity of the utility distribution transformer 110. This module 204 is designed to monitor and measure key electrical parameters such as current, voltage, and power output from the transformer. Utilizing sensors and computing devices, the electrical output sensing module 204 provides precise and real-time data on the transformer's electrical output. This information is crucial for determining whether the transformer is operating within its optimal range or if adjustments are needed. By continuously analyzing the electrical output, the module helps in detecting deviations that may indicate inefficiencies or potential issues. The data gathered by the electrical output sensing module 204 is then used by the utility load-balancing system 114 to make informed decisions, such as managing power distribution and activating the local storage battery 116-1 to 116*n* during high-demand periods.

The Processors 206 in the utility load-balancing system 114 functions as the central computational hub, overseeing and analyzing data from the various system modules. These processors 206 execute algorithms to handle real-time information gathered from the temperature sensing module 202 and the electrical output sensing module 204. They transform this data into actionable insights, allowing the system to make informed decisions regarding power distribution and load balancing. Additionally, the processors 206 manage the operation of other system components, ensuring that the local storage battery module 210 and other elements operate harmoniously to maintain peak performance and system stability.

Database 208 acts as a key storage unit for both real-time and historical data from the temperature sensing module 202 and the electrical output sensing module 204. It keeps detailed records of temperature changes, electrical output measurements, and other important metrics over time. This storage allows the utility load-balancing system 114 to analyze trends, compare historical data, and perform predictive maintenance. By holding extensive records, database 208 helps the system recognize patterns, anticipate potential problems, and apply effective solutions for managing transformers and balancing loads.

In an embodiment, the local storage battery module 210 is built to capture and hold excess energy produced when demand is low, and then release it back into the power grid 112 during high-demand periods or emergencies. This module 210 employs advanced battery technologies, like Tesla or Generac batteries, to store large amounts of electrical energy. When there is a transformer overload, overheating, or a local power outage, the local storage battery module 210 can provide the stored energy to the grid. This helps balance power output and fulfills the energy needs of connected users (118-1 to 118-n). Its function is vital for maintaining grid stability and ensuring a steady supply of power.

In an embodiment, the analysis module 212 handles and interprets data from both the temperature sensing module 202 and the electrical output sensing module 204. Utilizing machine learning algorithms, this module 212 analyzes performance metrics, uncovers trends, and identifies anomalies. By learning from historical and real-time data, it can predict potential problems such as transformer inefficiencies or capacity issues. These insights allow the utility load-balancing system 114 to proactively adjust operations, including activating the local storage battery module 210 and fine-tuning power distribution strategies, to ensure the power grid 112 operates smoothly and efficiently.

In an embodiment, the communication module 214 plays a vital role in the overall operation of the utility load-balancing system 114 by ensuring continuous and seamless data exchange between the local storage battery 116-1 to 116-n, inverter, utility service provider 102, and users 118-1 to 118-n. This Module 214 is designed to handle real-time communication flows and control signals required to maintain balance within the power grid 112 and prevent overload conditions. The communication module 214 enables the utility service provider 102 to send requests for power dispatch from the local storage battery 116-1 to 116-n when demand on the power grid 112 is high, ensuring optimal resource allocation. Additionally, it monitors key performance parameters, such as temperature variations and electrical output, and relays this information to both the utility service provider 102 and the user 118-1 to 118 n for real-time monitoring and decision-making.

In further detail, the communication module 214 is composed of multiple sub-components that work together to manage different aspects of the system. The Inverter Communication Module (ICM) 216 is embedded within the inverter and is responsible for several critical functions. One of its primary roles is DC to AC Conversion, which involves converting the direct current (DC) stored in the battery into alternating current (AC) that can be used by the electric panel and meter for household consumption or export to the grid. This ensures that the energy stored in the battery is readily usable in a form that aligns with grid standards. Additionally, the ICM 216 ensures Protocol Compliance, which facilitates seamless and standardized communication between the battery inverter, the utility service provider, and the user. This compliance is crucial for enabling interoperability across various manufacturers and utility networks. The ICM 216 also manages Power Dispatch Control, where it governs the amount of stored battery power to be dispatched to the power grid 112. It ensures that 50%-75% of the battery's energy is released to the power grid 112 based on real-time utility requests, balancing grid stability and battery availability. By doing so, the ICM 216 optimizes energy flow while maintaining reserves for both grid support and local consumption needs.

The Utility Communication Interface (UCI) 218 serves as a centralized system for utility service provider 102 to efficiently manage and optimize power distribution across the power grid 112. It provides real-time monitoring of available power, allowing utilities to observe energy availability in various regions of the power grid 112 as it fluctuates. The UCI 218 also handles emergency standby power management by tracking power commitment agreements from battery owners, including the location and registration of inverters, to ensure availability during critical times. Additionally, it facilitates real-time power requests by enabling utilities to send immediate dispatch commands to battery inverters based on current grid demands, thereby supporting dynamic energy management. Finally, the UCI 218 is responsible for power purchase accounting, where it calculates and tracks the total power purchased from battery owners, ensuring accurate reconciliation of electric bill credits and processing payments for emergency standby power and dispatched energy. This encompasses both standby payments, where the UCI 218 processes service fees for keeping batteries available for emergency use, and power payments, which are made for the actual energy dispatched to the grid upon utility requests or during local transformer outages. The UCI 218 ensures accurate reconciliation of electric bill credits and efficient processing of all payments related to standby and dispatched power.

The User App Interface (UAI) 220 is a mobile or web application designed to work seamlessly with OEM inverter software, providing battery owners with a range of functionalities. It allows users to manage permissions, granting or revoking access for the utility service provider 102 to control their battery inverter as needed. Through the UAI 220, users receive real-time notifications about power dispatch requests and emergency standby power commitments, keeping them informed about any actions involving their battery power. Additionally, the UAI 220 enables users 118-1 to 118-n to monitor the status of their battery, track power dispatch activities, and review their earnings from power transactions, offering a comprehensive view of their involvement in the power distribution system.

The Localization and Control Mechanism (LCM) 222 ensures that power dispatch requests are accurately localized and controlled based on the user's location and the specific requirements of the utility service provider 102. It employs geolocation services to identify the user's physical location and aligns it with the local utility's grid to ensure that dispatch requests are relevant to the local area. Furthermore, the LCM 222 guarantees that power requests are specific to the user's local grid, preventing unnecessary or widespread dispatches. Additionally, user consent is obtained for each power dispatch request through the User App Interface (UAI) 220, ensuring transparency and control for the battery owner in every transaction.

Figure 3:
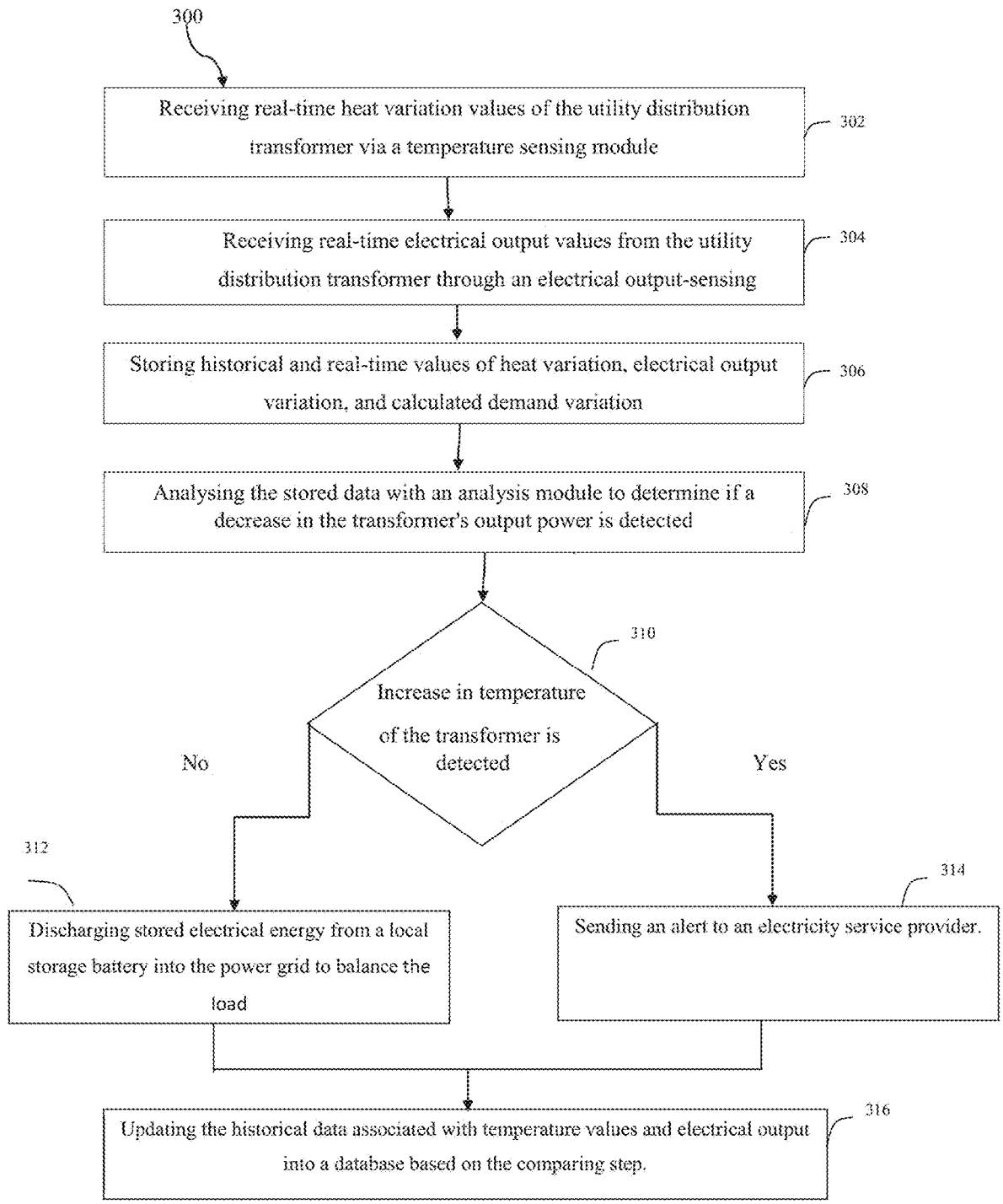
FIG. 3 illustrates a flowchart for a method for preventing overload/blackouts in a utility distribution transformer according to one embodiment of the present invention.

FIG. 3 is a flow chart illustrating a method for preventing overload and blackouts in a utility distribution transformer 110 within a local power grid 112.

In Step 302, the system collects real-time temperature fluctuations from the utility distribution transformer 110 using an integrated temperature sensing module 202. These heat variation values are crucial for monitoring the transformer's operational status and detecting potential overheating issues.

In Step 304, the system then gathers real-time electrical output data through an electrical output-sensing module 204. This data helps calculate the electrical output demand at any given moment, providing insights into the transformer's electricity generation and its adequacy in meeting the current load requirements.

In Step 306, the system stores both real-time and historical data, including heat variation, electrical output variation, and demand calculations. Real-time data is continuously recorded to monitor current conditions, while historical data is archived to track trends over time, providing a comprehensive basis for effective analysis and decision-making. In Step 308, the system then uses an analysis module 212 to evaluate this stored data, determine performance trends, detect anomalies, and assess utility distribution transformer 110 efficiency. The insights gained from this analysis guide necessary adjustments and improvements to maintain grid stability. The system detects a decrease in the transformer's output power. The system detects both a reduction in the transformer's power output and an increase in its temperature. When these conditions are identified simultaneously. If the system detects a decrease in the transformer's output power, the system proceeds to the next step. Here, stored electrical energy from a local storage battery 116-1 to **116-*n* is discharged into the power grid 112. This action helps to balance the load and maintain grid stability. The system detects both a reduction in the transformer's power output and an increase in its temperature the system moves to the next step. In this step, an alert is sent to the utility service provider 102, notifying them of the potential issues with the transformer. This prompt alert helps ensure that necessary actions can be taken to address any problems and prevent potential disruptions or damage. In the final step the system updates the historical data by incorporating the latest temperature values and electrical output measurements. This update is based on the analysis performed in the preceding steps, ensuring that the database reflects the most current and accurate information Step 308 involves comparing real-time values with historical data stored in the database to evaluate the performance of the utility distribution transformer 110**.

In Step 310, the system communicates the analysis results via a communication module 214 to an inverter connected to a local storage battery 116-1 to **116-*n* and transmits information to the utility service provider 102 and user 118-1 to 118-*n* through a user application interface 220**.

Based on these results, in Step 312, the system adjusts the power supplied by the local storage battery 116-1 to **116-*n* via the inverter to balance the load on the utility distribution transformer 110 and prevent overload. In Step 314, the system controls power distribution to the local power grid 112** based on demand and transformer performance, thereby preventing blackout conditions.

The invention incorporates a communication module that offers numerous benefits to both users and utilities. One significant advantage is enhanced grid stability. By enabling better integration of battery storage systems into the grid, the communication module helps to ensure a more stable and reliable power supply. Utilities can also experience cost reductions by utilizing battery storage systems for peak shaving instead of relying on expensive diesel generators, which are more costly and less environmentally friendly. Battery storage systems contribute to environmental benefits by producing no toxic emissions or $CO2$, aiding utilities in meeting their emissions reduction targets.

Another notable benefit of communication module is revenue generation. Homes and businesses equipped with battery storage systems can sell excess power back to the grid, creating new revenue streams. Furthermore, battery storage systems offer instant power delivery, unlike diesel generators which require time to start up. This immediacy enhances energy management, allowing utilities to optimize power distribution and reduce peak demand effectively.

The communication module also allows utilities to target power sources more efficiently. They can select specific locations where power is needed most and request power from battery systems in those grid regions, thus increasing overall efficiency.

To achieve these benefits, communication module should include key operating parameters. Interoperability is crucial to ensure compatibility between different battery and inverter manufacturers. Real-time monitoring and control are essential for optimizing performance while respecting the consented parameters of battery system owners. The communication module must facilitate seamless grid integration to allow efficient power distribution and load balancing. Safety and reliability are paramount, requiring robust communication protocols to ensure the secure operation of battery storage systems. Scalability is also important, supporting various sizes of battery storage systems from residential to commercial applications. Lastly, the communication module should enhance energy efficiency by enabling precise control over charging and discharging cycles, optimizing the overall performance of the battery storage system.

I claim:

1. A utility distribution transformer overload/blackout preventing system, the system comprises:
 a utility service provider serving a plurality of users through a utility distribution transformer and a utility load-balancing system, the utility load balancing system comprising:
 a local storage battery associated with a user of the utility service provider;
 an inverter coupled to the local storage battery;
 a temperature sensing module configured to receive, in real-time, heat variation values of the utility distribution transformer;
 an electrical output-sensing module to sense real-time electrical output values of said utility distribution transformer and calculate an output demand at a particular time;
 a database configured to store historical and real-time values of heat variations, electrical output variations, and calculated demand variations with respect to time;
 an analysis module configured to compare the received real-time values with one or more historical values to determine a performance of the utility distribution transformer; and a communication module adapted to provide communication between the inverter, the utility service provider, and the user through an user application interface, wherein if said determination detects a reduced power output and an increase in temperature of the transformer, sending an alert to a utility service provider, or if said determination detects a decrease in the transformer output power without a change in the temperature of the transformer, discharging the stored electrical energy from the local storage battery into the power grid to balance the load.

2. The system of claim 1, wherein the local storage battery system includes modular slots designed to accommodate a range of energy storage devices.

3. The system of claim 1, wherein the temperature sensors communicate via WiFi, cellular signal, or hardwired connections on telephone poles.

4. The system of claim 1, wherein the communication module further comprises an Inverter Communication Module (ICM) configured to convert direct current (DC) from a battery into alternating current (AC) and manage power dispatch to a power grid.

5. The system of claim 1, wherein the communication module further comprises a Utility Communication Interface (UCI) configured to continuously track available power, provide real-time data for power dispatch requests, and manage power commitment agreements and emergency standby power based on real-time grid demand.

6. The system of claim 1, wherein the communication module further comprises a User App Interface (UAI) configured to grant permissions for the utility service provider to access and control the inverter, provide real-time notifications for power dispatch and standby commitments, and monitor battery status, dispatch activity, and earnings.

7. The system of claim 1, wherein the communication module further comprises a Localization and Control Mechanism (LCM) configured to use geolocation to match the user's location with the local utility's grid, ensure localized power dispatch requests, and obtain user consent for each request through the User App Interface (UAI).

8. The system of claim 1, wherein the communication module further comprises a User App Interface (UAI) configured to enable user permissions, receive real-time notifications, and monitor battery power status and dispatch.

9. A method for preventing overload and blackouts in a utility distribution transformer within a local power grid, said method comprising:
   receiving real-time heat variation values of the utility distribution transformer via a temperature sensing module;
   receiving real-time electrical output values from the utility distribution transformer through an electrical output-sensing module and determining the electrical output demand at a specific time;
   storing historical and real-time values of heat variation, electrical output variation, and calculated demand variation comparing, by an analysis module, the real-time values with historical values stored in the database to evaluate the performance of the utility distribution transformer;
   communicating, via a communication module, the analysis results in an inverter connected to a local storage battery, and further transmitting information to a utility service provider and a user through a user application interface;
   adjusting, based on the analysis results, the power supplied by the local storage battery via the inverter to balance the load on the utility distribution transformer and prevent overload;
   controlling the power distribution to the local grid based on the demand and transformer performance to prevent blackout conditions,
   wherein if said determination detects a reduced power output and an increase in the temperature of the transformer, sending an alert to a utility service provider, or if said determination detects a decrease in the transformer output power without a change in the temperature of the transformer, discharging the stored electrical energy from the local storage battery into the power grid to balance the load.

10. The method of claim 9, wherein the historical data includes minute-by-minute measurements of current values and heat values.

11. The method of claim 9, further comprises calculating the rate of change of temperature and voltage fluctuations to enhance the precision of the real-time information on heat variations and changes in output power.

12. The method of claim 9, wherein the amount of energy discharged from the local storage battery is determined using an optimization algorithm that considers predicted future energy demand and transformer performance trends.

13. The method of claim 9, further comprises generating real-time warning alerts for temperature rises and transformer shutdowns.

14. The method of claim 9, further comprises converting, by the Inverter Communication Module (ICM), direct current (DC) from the local storage battery into alternating current (AC) and managing power dispatch to the power grid based on real-time demand.

15. The method of claim 9, further comprises tracking, via the Utility Communication Interface (UCI), available power from the local storage battery in real-time, providing real-time data for power dispatch requests, managing power commitment agreements and emergency standby power based on real-time grid demand.

16. The method of claim 9, further comprises granting, via the User App Interface (UAI), permissions to the utility service provider to access and control the inverter; sending real-time notifications for power dispatch and standby commitments; and monitoring battery status, dispatch activity, and earnings from energy contributions.

17. The method of claim 9, further comprising using, by the Localization and Control Mechanism (LCM), geolocation to match the user's location with the local utility's grid; ensuring localized power dispatch requests to the local grid; and obtaining user consent for each power dispatch request through the User App Interface (UAI).

18. The method of claim 9, further comprising enabling user permissions via the User Application Interface (UAI) for interacting with the utility grid; receiving real-time notifications on battery power status and dispatch activity; and monitoring battery charge levels, dispatch commitments, and standby status.

\* \* \* \* \*